June 21, 1966 G. D. DUMBAUGH ETAL 3,257,040
COUNTERBALANCED VIBRATORY HOPPERS
Filed July 9, 1964 4 Sheets-Sheet 1

INVENTORS.
GEORGE D. DUMBAUGH
HOWELL C. WILLIS
BY Marshall, Wilson & Yeasting
attorneys June 21, 1966  G. D. DUMBAUGH ETAL  3,257,040
COUNTERBALANCED VIBRATORY HOPPERS Filed July 9, 1964  4 Sheets-Sheet 2

INVENTORS.
GEORGE D. DUMBAUGH
HOWELL C. WILLIS
BY Marshall, Wilson & Yeasting
—attorneys—

June 21, 1966 G. D. DUMBAUGH ET AL 3,257,040
COUNTERBALANCED VIBRATORY HOPPERS
Filed July 9, 1964 4 Sheets-Sheet 3

INVENTORS.
GEORGE D. DUMBAUGH
HOWELL C. WILLIS
BY Marshall, Wilson & Yeasting
attorneys June 21, 1966  G. D. DUMBAUGH ETAL  3,257,040
COUNTERBALANCED VIBRATORY HOPPERS Filed July 9, 1964  4 Sheets-Sheet 4

INVENTORS.
GEORGE D. DUMBAUGH
HOWELL C. WILLIS
BY Marshall, Wilson & Yeasting
—attorneys—

United States Patent Office 3,257,040
Patented June 21, 1966

3,257,040
COUNTERBALANCED VIBRATORY HOPPERS
George D. Dumbaugh and Howell C. Willis, Jeffersonville, Ind., assignors to Carrier Manufacturing Co., Jeffersonville, Ind., a corporation of Kentucky
Filed July 9, 1964, Ser. No. 381,424
3 Claims. (Cl. 222—161)

This invention relates to vibratory supply hoppers for discharging powdered, granular, pulverized, or the like material.

When solid materials such as granular or fibrous solids or small parts are used in manufacturing processes, the materials are often supplied to the processes from storage bins overlying vibratory hoppers, i.e., the vibratory hoppers serve as live bottoms for stationary storage bins. The equal and opposite reaction of the vibration of the vibratory hopper is transferred, in the prior bin construction, to the supporting structure for the stationary storage bin. This arrangement deleteriously vibrates building structures, wastes energy, requires additional mass of high cost which has no function other than to counteract the vibration, and derives no substantial benefit from the vibration transmitted through the storage bin.

Accordingly, the objects of this invention are to improve vibrated hoppers, to improve the performance of such hoppers, to simplify the construction of such hoppers, to mount and isolate such hoppers so that vibration transmitted to the supporting structure is negligible, to fluidize an entire system including a storage hopper and its live bottom, and to vibrate such a system with the minimum amount of energy.

One embodiment of this invention enabling the realization of these objects is an apparatus for conveying a column of material downward comprising an isolated storage bin mounted to move in any given direction and a hopper which is similarly mounted and which is hung from the bin. The hopper is vibrated and the equal and opposite reaction of a spring system connecting the bin to the hopper is utilized to impart vibration to the storage bin. The entire bin-hopper system is fluidized using a minimum amount of energy and the bin is used as a counterbalancing member for the hopper. The bin, i.e., the counterbalancing member, is operated in phase opposition with the hopper.

One feature of this invention resides in using the storage bin and the live bottom therefor as two balanced members. This means that it is not necessary to provide additional mass of high cost that has no function other than to balance the vibrating unit. Also, vibration transmitted to the supporting structure is negligible. Building vibration deleteriously affects auxiliary equipment and operations, such as the accurate operation of weighing scales.

Another feature resides in fluidizing the entire bin-hopper system. This increases the efficiency of the vibratory system and improves the performance of the vibratory system. Force components which do not work are not generated and the entire bin-hopper system conveys the column of material downward by vibration.

The above and other objects and features of this invention will be appreciated more fully from the following detailed description when read with reference to the accompanying drawings wherein.

Figure 1:
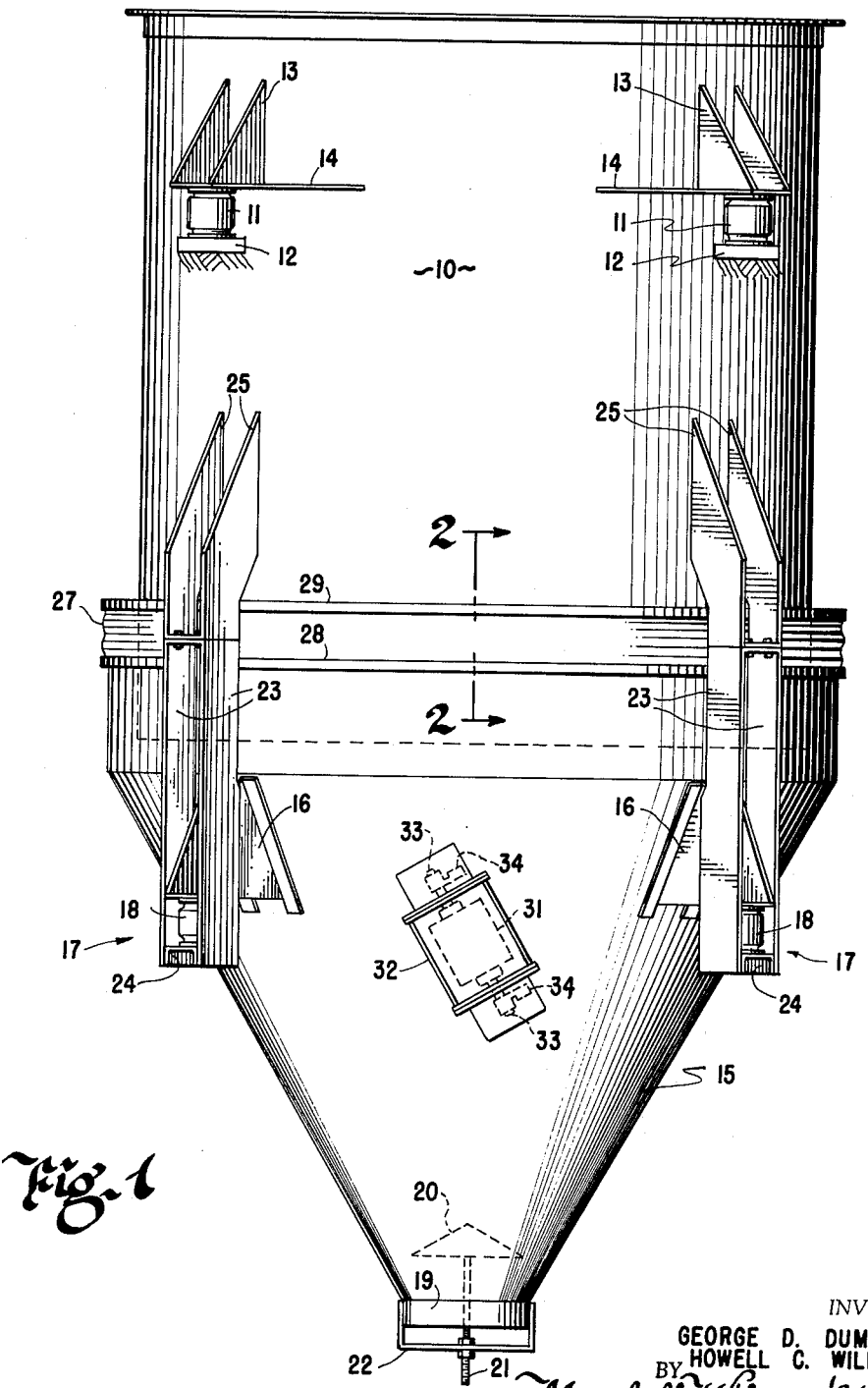
FIG. 1 is an elevational view of one form of isolated vibratory bin according to this invention.
Figure 2:
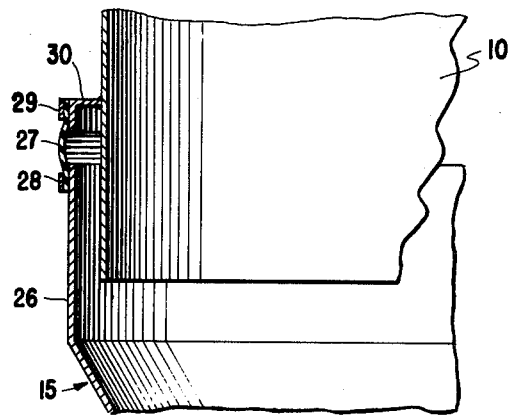
FIG. 2 is a fragmentary vertical section taken along the line 2—2 of FIG. 1.

Referring to FIGS. 1 and 2, the vibratory bins that do work by vibration, contemplated by this invention, are of general utility as supply hoppers from which material is intended to flow. A storage bin 10, which can be of any shape, size or weight, in the form shown in FIG. 1 is a hollow right cylinder and is supported through three isolation mounts 11 for movement in any given direction. Only two of the three isolation mounts 11 are shown, the mounts 11 being 120 degrees apart. Any suitable isolation mounting means, such as rubber bags filled with air or liquid, solid rubber members, or coil steel springs can be used. Each of the isolation mounts 11 is supported on a base plate 12 and is connected to the bin 10 through a channel shaped bracket 13 The brackets 13 are securely tied to the bin 10 by means of horizontal plates or wings 14. This supports the bin 10 adjacent its upper or intake end by resilient mounting means, i.e., the isolation mounts 11.

A hopper 15 which is like the hopper shown in FIGS. 1 and 2 in U.S. application Ser. No. 326,477 filed November 27, 1963, now Patent No. 3,178,068, in the name of George D. Dumbaugh is in the form of a frustum of a cone which is provided with four mounting brackets 16, only two of which are shown (mounting brackets 16 are ninety degrees apart). Each of the mounting brackets 16 is mounted upon a support 17 by means of a flexible rubber bag 18 which contains air and liquid under pressure. These flexible rubber bags support the hopper 15 resiliently and provide the hopper with a limited freedom of movement in all directions. In place of the flexible rubber bags 18 it is possible to employ rubber bags filled with air or liquid, solid rubber members or even steel springs. The hopper is provided at its lower end with a short cylindrical section 19 which is open at the bottom to permit material to be discharged. In order that the rate of flow of material from the hopper may be adjusted, a conical baffle 20 is mounted on a threaded stem 21 which passes through and is adjustably secured to a U-shaped bracket 22 fixed to the cylindrical section 19.

Each of the supports 17 includes a pair of spaced vertical legs 23 which straddle the respective mounting bracket 16 and which are interconnected at their lower ends by means of a channel 24 upon which the bottom of the respective rubber bag 18 bears. The upper ends of the legs 23 are rigidly connected to arms 25 that reach down from the storage bin 10. This suspends the hopper 15 from the bin 10. The hopper 15 is vibrated as hereinafter described and the equal and opposite reaction of the vibration in the hopper is utilized to impart vibration to the bin.

The hopper 15 is provided with an upper cylindrical portion 26 which telescopes with the lower end of the bin 10. In order to provide a dust seal, a flexible seal 27 has its lower end clamped by means of a band 28 against the exterior of the cylindrical portion 26 and has its upper end clamped by means of a similar band 29 against a flange 30 (FIG. 2) which is provided on the exterior of the bin 10.

The hopper 15 is provided with mechanism for imparting to the hopper a helical vibratory movement having a vertical component and having another component consisting of oscillation of the hopper about its vertical axis. This mechanism comprises a pair of electrical motors 31 as shown in the above FIGS. 1 and 2 of U.S. application Serial No. 326,477, now Patent No. 3,178,068, secured to opposite sides of the hopper 15. Only one of the motors 31 can be seen in FIG. 1. Each of the motors 31 is enclosed in a sealed housing 32. The shaft 33 of each of the motors 31 is eccentrically loaded at both ends by a pair of weights 34 fixed to the shaft.

The motor shafts 33 are inclined at equal and opposite angles to a plane passing through the vertical axis of the hopper and through midpoints of the two motor shafts. Because of this inclination of the motor shafts, each complete rotation of the motor shafts not only causes one complete oscillation of the hopper 15 on its vertical axis but also causes one complete vertical reciprocation of the hopper. The resultant of the combined oscillation and vertical reciprocation of the hopper is a helical vibratory movement of the hopper. In place of the mechanism shown in FIG. 1, any other desired mechanism may be employed for imparting a helical vibratory movement to the hopper 15. The equal and opposite reaction of the vibration in the hopper 15 is utilized to impart vibration to the bin 10 (a helical vibratory movement is imparted to the bin 10). The mounts 11 isolate the vibration of the bin 10 from supporting structure.

The bottom of the bin 10, i.e., the hopper 15, is suspended on the separate spring system, i.e., rubber bags 18, and is energized by the exciters which impart a vibration to the hopper 15. The spring system for the hopper 15 is in turn supported rigidly from the bin 10 above, which is supported on its own spring system, i.e., the rubber bags 11. As a result, controlled vibratory motion is imparted to the bin 10 and the entire system, i.e., the bin 10 and hopper 15, is activated, and, if designed properly, approaches a perfect balance. The bin and hopper are operated in phase opposition to thereby cancel opposed forces. Any need for additional mass which has no function other than to balance the vibratory unit is eliminated, the entire bin arrangement (within practical size limits) is completely energized and becomes dynamic to prevent rat holeing in the upper portion and enhances fluidizing the full height of the bin. The energy that heretofore has been absorbed by the building structure is absorbed, in the arrangement of the invention, by the upper bin structure and put to beneficial use. The exciters can be mounted on the bin 10 and the hopper 15 then can act as the counterbalancing member.

It is not necessary that the bin and hopper be given helical vibratory movements. Any vibratory path in which the bin and hopper move in phase opposition is satisfactory. The distance the bin and hopper move is inversely proportional to the mass, e.g., if the hopper weighs one third as much as the bin, it will move in its vibratory path three times as far as the bin. Such relatively large movement assures a good dynamic condition in the lower portion of the system. The movement is a harmonic motion with energy being stored in the spring systems as the two balanced members stop momentarily at the remote ends of the path before reversing direction and moving toward each other. If the bin and hopper do not counterbalance each other, a third mass can be provided. The springs that support the hopper 15 from the bin 10 operate close to natural frequency if not actually within natural frequency and can be mounted vertically, or mounted at an angle with the vertical. If the springs are mounted vertically as shown in FIG. 1, they may have the same spring rate axially as they do laterally. If the springs are mounted at an angle with the vertical, the unit is designed for natural frequency vertically, and relies on a small amount of additional force to provide the necessary lateral movement. Generally, the spring system that connects the hopper 15 to the bin 10 is so designed that as additional material is poured into the bin and hopper, and thus the vertical component is increased, the springs will become closer and closer to natural frequency. When the hopper is full, the springs contribute their largest amount of effort, since this is the time it is needed.

The springs that support the bin 10 are so designed that good isolation is obtained, with the least amount of dampening, i.e., a tuned system. Since the hopper 15 has a high frequency when empty which becomes smaller as material is added to the hopper, the hopper 15 and its adjuncts have a high frequency diminishing to a minimum. On the other hand, the bin 10 has a low frequency. Examples of frequency values are 1200 c.p.m. for the hopper 15 when empty diminishing to 870 c.p.m. as the hopper is filled. The frequency of the upper bin's isolators, as an example only, is 270 c.p.m. As the bin is filled with material, the entire system tends to dampen. To correct this, more than two of the exciter units described above in connection with FIG. 1 can be used. Conceivably, six exciters, eight exciters, perhaps even twenty exciters, i.e., any other combination of pairs, can be used. Two motors are energized initially to correct the dampening as the bin is filled. Then, as more and more material is added and the vertical component is dampened further, two more motors are energized, etc. Some of these added exciters may have their stroke vertical in contrast to the inclined motors 31 (the motors 31 are diametrically opposite, slightly inclined and swing free weights).

Figure 3:
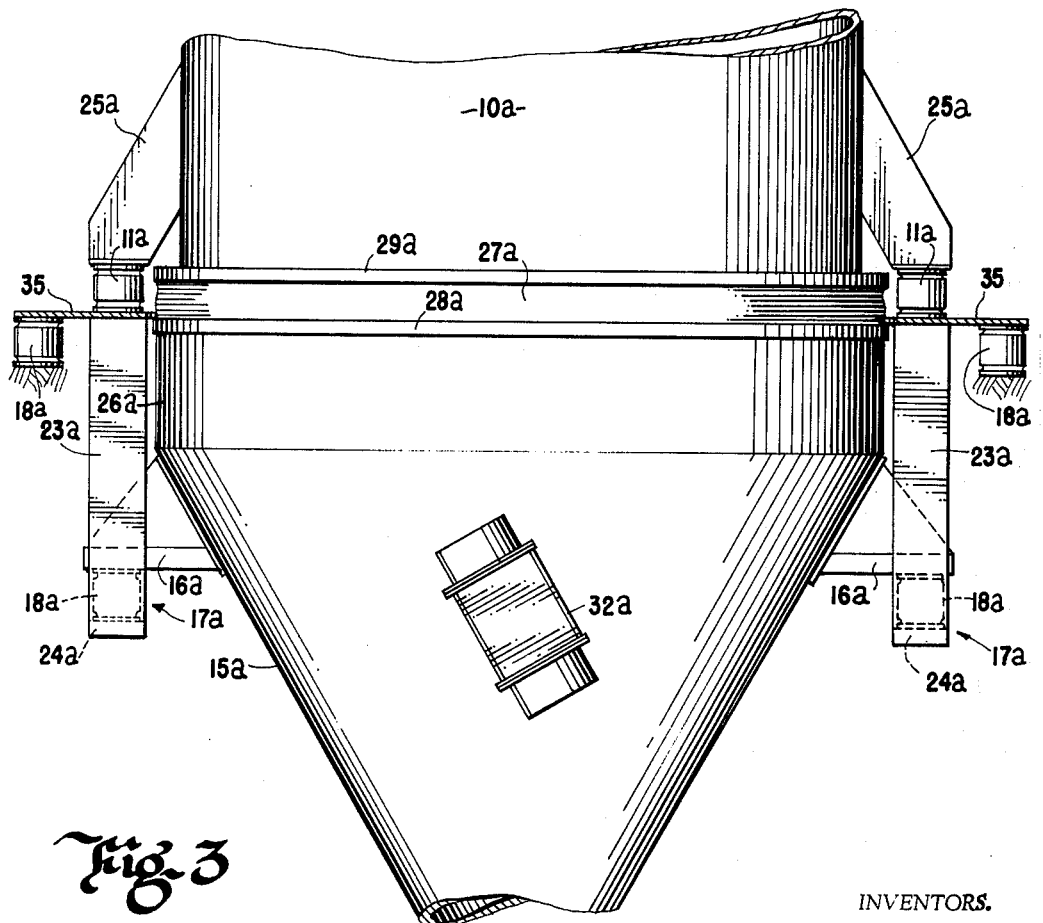
FIG. 3 is a fragmentary elevational view of a modified form of device embodying the invention.

A modified balanced vibratory bin is shown fragmentarily in FIG. 3. Similar reference numbers in FIGS. 1–2 and 3 refer to parts which are alike in structure and function. A heavy ring 35 is supported on a suitable number of flexible rubber bags 18a which contain air and liquid under pressure. A storage bin 10a is supported through a suitable number of flexible rubber bags 11a, which contain air and liquid under pressure, on the ring 35, the bin 10a extending downwardly through the ring and being provided with arms 25a which connect the bin 10a and the tops of the rubber bags 11a. A hopper 15a is connected through its mounting brackets 16a to rubber bags 18a carried by supports 17a each of which includes a pair of spaced vertical legs 23a which straddle the respective bracket 16a and which are interconnected at their lower ends by means of a channel 24a upon which the bottom of the respective rubber bag 18a bears. The upper ends of the legs 23a are rigidly connected to the bottom of the ring 35. The hopper 15a is vibrated in the same manner as is the hopper 15 (FIG. 1) and the equal and opposite reaction of the vibration in the hopper is utilized to impart vibration to the bin. As a result, the entire system, i.e., the bin 10a and the hopper 15a, is activated and, if designed properly, performs a perfect balance. It is conceivable to place exciters on the bin 10a also and have a neutral ring.

The ring 35 is located at the neutral node point of the vibratory system. In the vibratory system shown in FIG. 1, the helical vibratory movement imparted to the bin 10 causes some vibration to be transmitted to the building structure even though the mounts 11 isolate the vibration of the bin 10 from the supporting structure. In contrast, in the vibratory system shown in FIG. 3, the bin 10a and the hopper 15a both move in a helical path (harmonic motion) in the same manner as do the bin 10 and the hopper 15 shown in FIG. 1, however, the bin 10a and the hopper 15a are carried by the ring 35 which is resiliently supported at the neutral node point of the vibratory system. Accordingly, little if any vibrations are transmitted to the building structure. The foregoing constructions result in a balancing of the forces, since the bin and hopper are vibrated in direct phase opposition, that is, when the bin 10 or 10a is moving upwardly along the helical path the counterbalancing hopper 15 or 15a is moving downwardly along such helical path, and similarly when the bin 10 or 10a is moving downwardly along the helical path the counterbalancing hopper 15 or 15a is moving upwardly along such path. Whether the bin counterbalances the hopper or whether the hopper counterbalances the bin depends on which member the exciting means is mounted.

Figure 4:
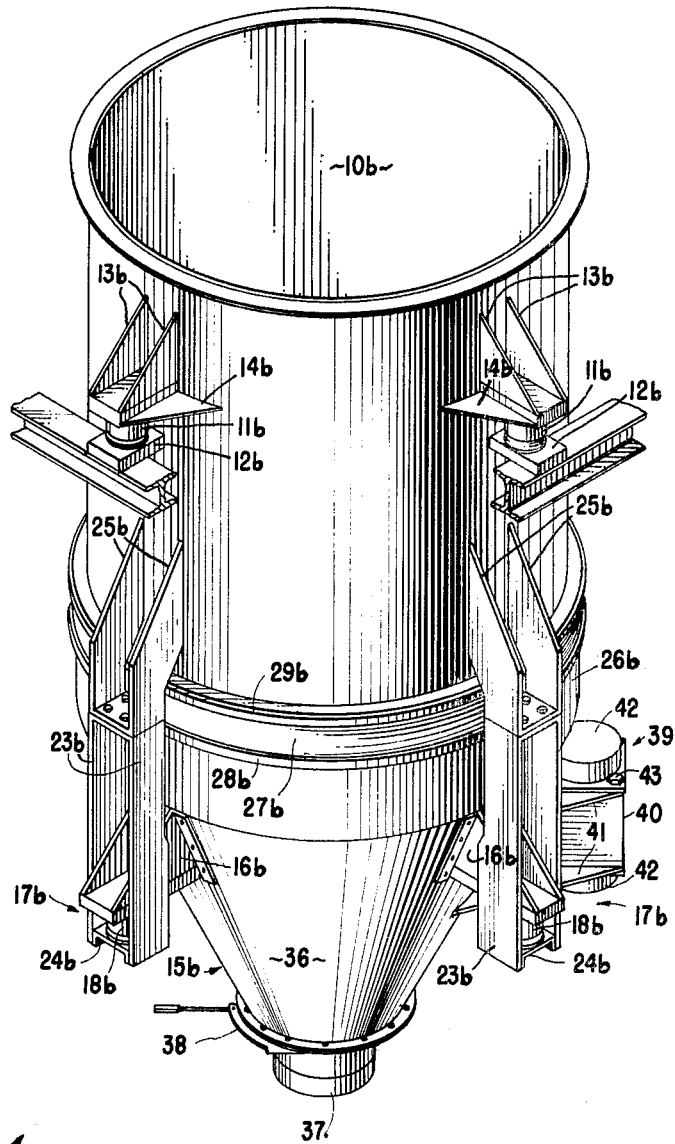
FIG. 4 is a perspective view of another modified form of device embodying the invention.

A second modification is shown in FIG. 4. Reference numerals in FIGS. 1–3 which are similar to those in FIG. 4 refer to parts generally alike in structure and function. A hopper 15b is shown which generally is like the gyrated hopper shown in FIG. 3 in U.S. application Serial No. 321,046 filed November 4, 1963 in the names of George D. Dumbaugh and Robert J. Hess. The hopper 15b has an inverted truncated cone portion 36 which tapers downwardly to a centered round discharge opening 37. The hopper 15b is equipped with a manually adjustable gate 38 at the discharge end. The gate 38 provides a variable discharge of the material or a positive shut-off if required. A dust seal like the ones shown in FIGS. 1–3 is used between the top of the gyrated hopper 15b and the bottom of a storage bin 10b.

The storage bin 10b is supported through three isolation mounts 11b like the bin 10 is (FIG. 1) and the hopper 15b is supported through four isolation mounts 18b like the hopper 15 is. The bottom of the bin 10b, i.e., the hopper 15b, is suspended on the separate spring system, i.e., rubber bags 18b, and is energized by an exciter 39 which is like and arranged like the exciter that is shown and described in the above U.S. application Serial No. 321,046 and which imparts a vibration to the hopper 15b. The exciter 39, which includes a motor having a double extended shaft, is mounted to locate the shaft vertically (parallel to the axis) by means of a box 40 that is carried by two horizontal plates 41 secured to the side of the hopper 15b. The driving force for the system is supplied by two rotating eccentric flywheels or weights, which generate horizontal centrifugal forces, secured to the drive shaft. Access to the weights is provided through covers 42 attached to the plates 41 by means of nuts and bolts 43. The hopper 15b is vibrated by means of the rotatable weights which have a resultant center of gravity which is located in a horizontal plane that also contains the center of gravity of the hopper 15b and that passes through the midpoints of the rubber bags 18b. This arrangement results in a combination movement for the hopper 15b which rocks about its center of percussion and also slides in line with its center of percussion in a horizontal movement having negligible vertical components. The entire suspended hopper 15b is vibrated from top to bottom along a path normal to the longitudinal axis of the hopper to effect or ensure the flow of material therefrom.

The spring system for the hopper 15b is in turn supported rigidly from the bin 10b above, which is supported on its own spring system, i.e., the rubber bags 11b. As a result, controlled vibratory motion is imparted to the bin 10b and the entire system, i.e., the bin 10b and hopper 15b, is activated, and, if designed properly, performs a perfect balance. The bin and hopper are vibrated in phase opposition to thereby cancel opposed forces.

Figure 5:
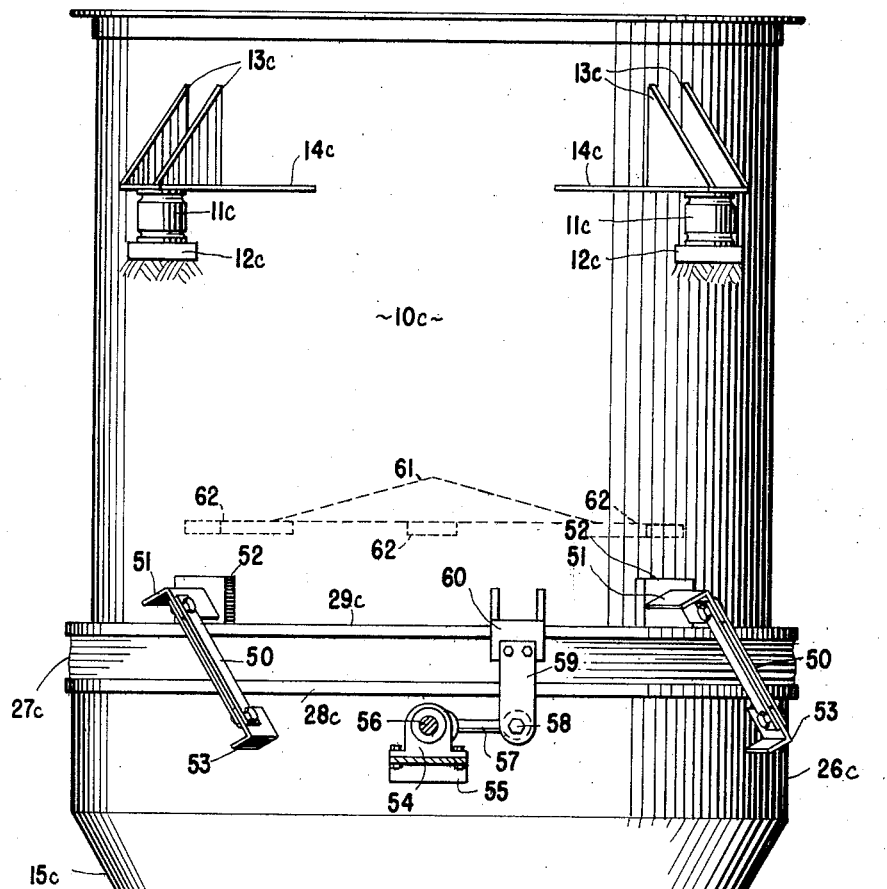
FIG. 5 is an elevational view of still another modified form of device embodying the invention.
Figure 5:
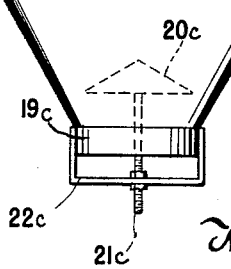

Another modified balanced vibratory bin is shown in FIG. 5. Similar reference numbers in FIGS. 1–4 and 5 refer to parts which are alike in structure and function. A storage bin 10c is supported through three isolation mounts 11c which support the bin for movement in any given direction in the same manner as the isolation mounts 11 (FIG. 1) support the bin 10. A hopper 15c is resiliently suspended from the bin 10c by means of a plurality of pairs of leaf springs 50. The upper ends of each pair of the leaf springs 50 are clamped to an angle bracket 51 carried on a block 52 provided on the exterior of the bin 10c. The lower ends of each pair of leaf springs are clamped to an inclined angle bracket 53 which is secured to the hopper 15c. The pair of leaf springs 50 are shown in FIG. 5 spaced apart a distance to require a total of four pairs. This would not be enough for a large bin-hopper system, only a minimum number of leaf springs being shown in FIG. 5 for the sake of simplicity. The pairs of leaf springs 50, which may be of any suitable spring material, such as steel or laminated glass fiber, constitute the sole support for the hopper 15c.

A pair of bearings 54 (only one shown), each mounted on a bracket 55 provided on the exterior of the hopper 15c, each rotatably supports a drive shaft 56, the bearings 54 being diametrically opposite one another. Each of the shafts 56 is driven by its own individual motor which is not shown for the sake of simplicity but which is carried by the respective bracket 55 outboard of the respective bearing 54. The ends of the drive shafts 56 inboard of the bearings 54 are each provided with an eccentric extension of reduced diameter on which is journaled one end of a connecting rod 57. A similar connecting rod drive arrangement is shown in FIG. 4 of the above U.S. application Serial No. 326,477. The other end of each of the connecting rods 57 is pivoted upon a rod 58 which is fixed in a pair of plates 59. Each pair of plates 59 in turn is fixed to a bracket 60 secured to the exterior of the bin 10c.

The eccentrics translate the rotary motion of the drive shafts 56 into vibratory motion of the bin 10c and hopper 15c (the connecting rods 57 drive the bin 10c and the hopper 15c alternately apart and together). The leaf springs 50 are flexed during such vibratory motion and determine the path through which the bin 10c and hopper 15c are vibrated. Because of the fact that the leaf springs 50 are inclined to the vertical, the movement imparted to the bin 10c and hopper 15c is a helical vibratory movement, similar to the helical vibratory movement of the bin 10 and hopper 15 shown in FIG. 1. As a result, the entire system, i.e., the bin 10c and hopper 15c, is activated, and, if designed properly, approaches a perfect balance. The bin and hopper are operated in phase opposition to thereby cancel opposed forces.

FIG. 5 also shows a relatively flat cone 61 located near the bottom of the bin 10c, and supported by radial arms 62 which are secured to the interior of the bin. The cone 61 functions to support a substantial part of the weight of the material in the bin 10c. If the cone 61 were omitted, the weight of much of the material in the bin 10c would tend to be transmitted to the hopper 15c, so that the bin 10c would tend to vibrate as an empty shell substantially free of the weight of the material therein. Thus the cone 61 functions to distribute the weight of the material between the bin 10c and the hopper 15c.

It is desirable to provide a cone similar to the cone 61 in all the bins shown in FIGURES 1–4, but for the sake of simplicity the cone is shown only in FIGURE 5.

It is to be understood that the dimensions and proportions of the structures may be varied to meet various conditions. The simplest structure is provided in each case by using only three of the mounts 11 and only three of the mounts 18. When the structures are heavy, however, it may be necessary to increase the number of mounts in order to reduce the size of each of the supporting brackets because of space limitations, or to avoid excessive concentration of loads at a limited number of points in the supporting portions of the building.

In the systems shown in FIGS. 1–3 and 5, the vibratory movement is symmetrical about the axis, so that the mounts 11 and 18 may be arranged symmetrically about the axis. In the system shown in FIG. 4, however, good results may be obtained by locating one mount diametrically opposite to the exciting motor and locating each of two other mounts at an angle of 45° on opposite sides of a vertical plane passing through the axis of the exciting motor and the axis of the hopper 15b.

In the system shown in FIG. 3, location of the ring 35 at the neutral plane of the vibratory system is a matter of design. In order to determine the neutral plane necessary to take into consideration the relative sizes of the two vibrating masses and the stiffness of the elements which function as springs. If one of the vibrating masses is heavier than the other, the neutral plane or node will not be located centrally with respect to the springs but will be displaced toward the heavier of the two vibrating masses. On the other hand, if the mass including the bin 10a is substantially equal to the mass including the hopper 15a, and if the springs 11a and 18a are of equal stiffness, the neutral plane will be located midway between the spring elements 11a and 18a instead of at the position indicated by the location of the ring 35 in FIG. 3. It will be understood that the structure including the legs 23a is not completely rigid but itself functions as a relatively stiff spring element.

In many cases it may be desirable to design the resilient mounts which support the bin so that these mounts act as relatively rigid bodies in opposing horizontal motion of the bin and as relatively soft bodies in opposing vertical motion of the bin. This type of design permits a desirable vertical vibratory movement of the bin and cushions such vibratory movement, and transmits to the building the horizontal forces which the building often is better adapted to withstand than vertical forces. When the resilient elements that support the bin are thus designed, the resilient elements by means of which the hopper is suspended from the bin should have the opposite characteristics and should be relatively stiff in resisting vertical movement of the hopper and relatively soft in resisting horizontal movement of the hopper. Such an arrangement will prevent excessive vertical movement of the relatively light hopper, and at the same time will permit adequate lateral movement of the hopper in spite of the lack of lateral movement of the bin.

It is to be understood that the above description is illustrative of this invention and that various modifications thereof can be utilized without departing from its spirit and scope.

Having described the invention, we claim:

1. An activated bin and hopper system comprising, in combination, a bin structure of relatively large mass which is mounted on isolators and has a bottom discharge opening, a hopper structure of relatively small mass below the bin structure, having a bottom discharge opening, a flexible connection between the hopper structure and the bin structure, and means for applying vibration to at least one of the two structures at a frequency close to the natural frequency of the system consisting of the two structures and the flexible connection, to cause the two structures to vibrate in phase opposition, the natural frequency of the system consisting of the two structures and the isolators being relatively remote from the frequency of the applied vibration.

2. An activated bin and hopper system comprising, in combination, a bin structure of relatively large mass which is mounted on isolators and has a bottom discharge opening, a hopper structure of relatively small mass having a bottom discharge opening, a flexible support by means of which the hopper structure is suspended below the bin structure to receive material from the bin structure, and mechanism for vibrating the two structures in phase opposition at a frequency substantially above the natural frequency of the system consisting of the two structures and the isolators.

3. An activated bin and hopper system comprising, in combination, a bin structure which has a bottom discharge opening, a hopper structure which has a bottom discharge opening and is located below the bin structure to receive material from the bin structure, a flexible connection between the two structures, isolators upon which the weight of the two structures is supported, and mechanism for vibrating the two structures in phase opposition at a frequency substantially above the natural frequency of the system consisting of the two structures and the isolators.

References Cited by the Examiner
UNITED STATES PATENTS

| | | | |
|---|---|---|---|
| 1,730,435 | 10/1929 | Munro | 209—315 X |
| 2,246,497 | 6/1941 | Beck | 222—161 |
| 2,346,690 | 4/1944 | Larkins | 222—161 X |
| 2,636,719 | 4/1953 | O'Connor. | |
| 3,012,697 | 12/1961 | Rouse et al. | 222—181 |

LOUIS J. DEMBO, *Primary Examiner.*

CHARLES R. CARTER, *Examiner.*